Feb. 8, 1927. 1,617,310
E. A. SPERRY
REPEATER COMPASS
Filed Oct. 12, 1920 3 Sheets-Sheet 1

Inventor
ELMER A. SPERRY.
By his Attorney
Herbert H. Thompson

Feb. 8, 1927.

E. A. SPERRY

REPEATER COMPASS

Filed Oct. 12, 1920  3 Sheets-Sheet 2

1,617,310

Inventor
ELMER A. SPERRY.
By his Attorney
Herbert H. Thompson

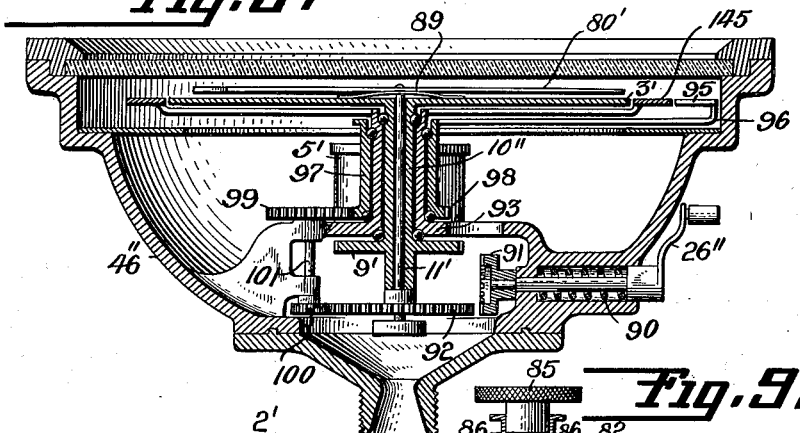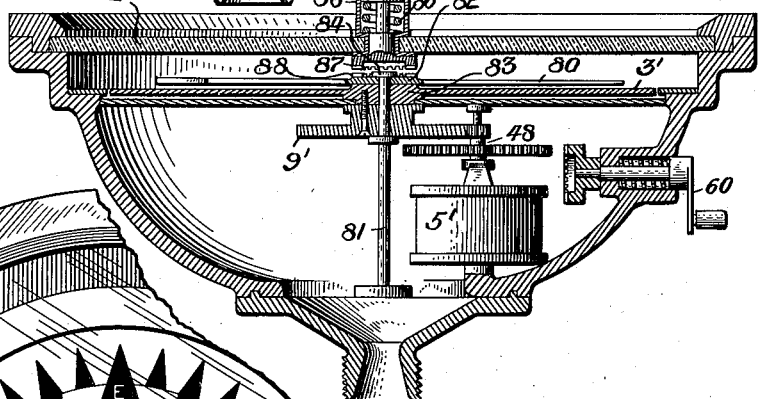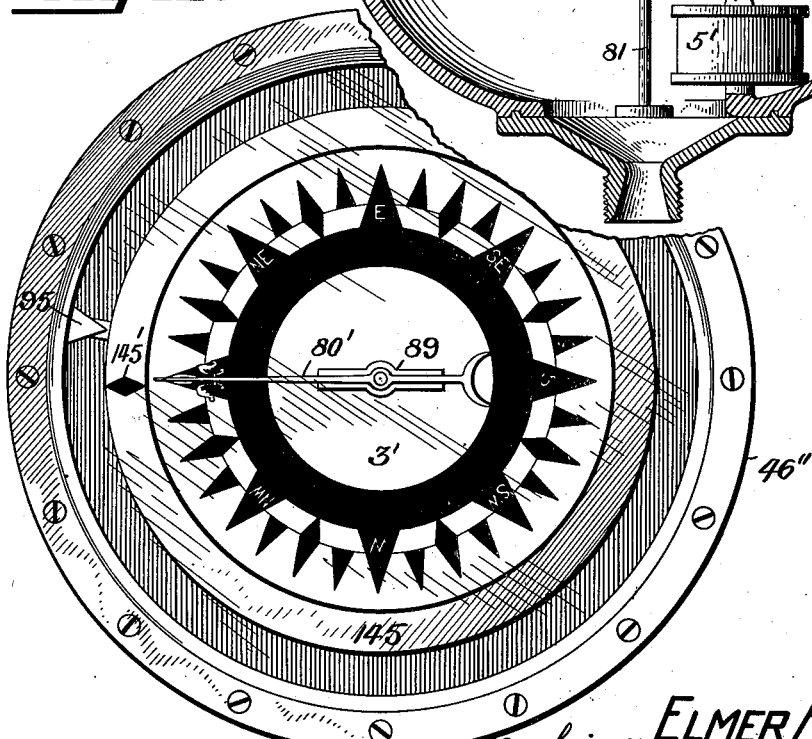

Patented Feb. 8, 1927.

1,617,310

UNITED STATES PATENT OFFICE.

ELMER A. SPERRY, OF BROOKLYN, NEW YORK, ASSIGNOR TO THE SPERRY GYROSCOPE COMPANY, OF BROOKLYN, NEW YORK, A CORPORATION OF NEW YORK.

REPEATER COMPASS.

Application filed October 12, 1920. Serial No. 416,505.

This invention relates to navigational instruments or steering devices for ships. More particularly the invention relates to an improvement in mariners' compasses especially adapted for repeater compasses operated from the gyro compass. It is well known that in maintaining the ship on a given course the helmsman must continually maintain the lubber's line on the compass opposite the graduation on the compass rose indicative of the desired course. As the graduations on the rose are comparatively fine it requires close attention on the part of the helmsman to maintain an exact course since one graduation may occasionally be mistaken for another and the ship allowed to depart from its course for short intervals thereby interfering with the dead reckoning calculations, etc. I am aware that attempts have been made to overcome this difficulty by providing the repeater compass with auxiliary cards geared to rotate at a multiple speed of the master dial. Such devices are, however, objectionable in that they place a heavy load upon the repeater motor and render the same less accurate and are very difficult to read since each revolution of the auxiliary dial represents only a fraction of a revolution of the main compass rose so that it cannot be provided with 360° graduations without complications.

By my invention I have provided an improved means for aiding the helmsman in maintaining the course without any of the above mentioned difficulties or disadvantages.

The principal subject matter of this application was heretofore disclosed and claimed in my prior application for U. S. Letters Patent, Serial No. 871,885, filed November 13, 1914 for "improvements in navigational apparatus" now matured into Letters Patent No. 1,360,694 dated November 30th, 1920. This application is, therefore, a continuation in part of said prior application.

Referring to the drawings in which what is now considered the preferred forms of the invention are shown:

Fig. 8 is a sectional elevation of a modified form of repeater compass.

Fig. 9 is a sectional elevation of another modified form of repeater compass.

Fig. 10 is a plan view of the form of compass shown in Fig. 8.

Figure 1:
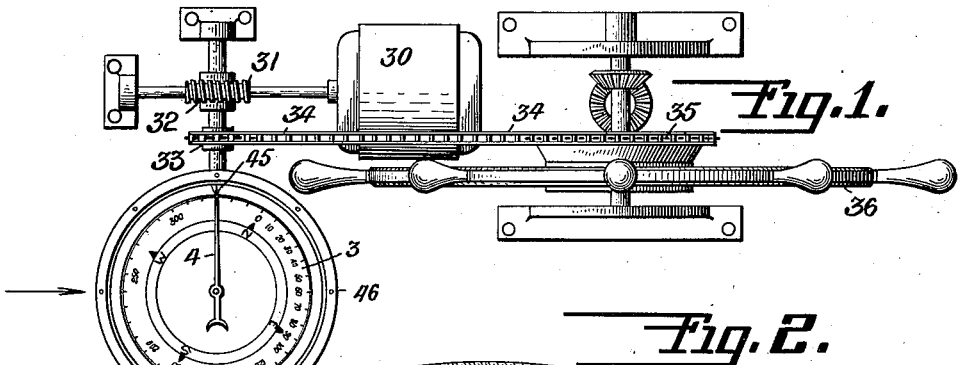
Fig. 1 is a plan view of an instrument constructed according to my invention and also employed for automatic steering of the ship as described in the aforesaid application.
Figure 2:
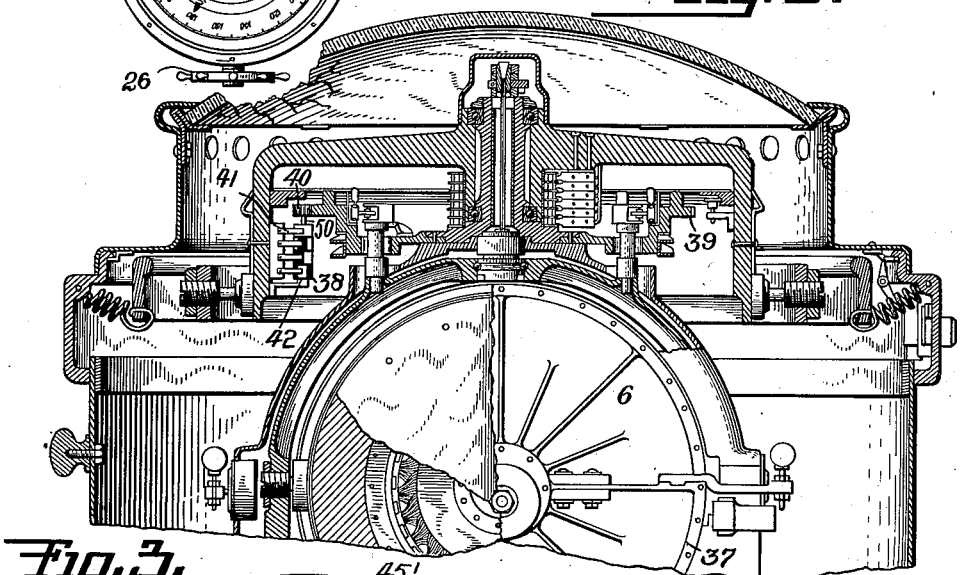
Fig. 2 is an elevation, partly in section, of a master gyro-compass used for actuating the repeater.
Figure 5:
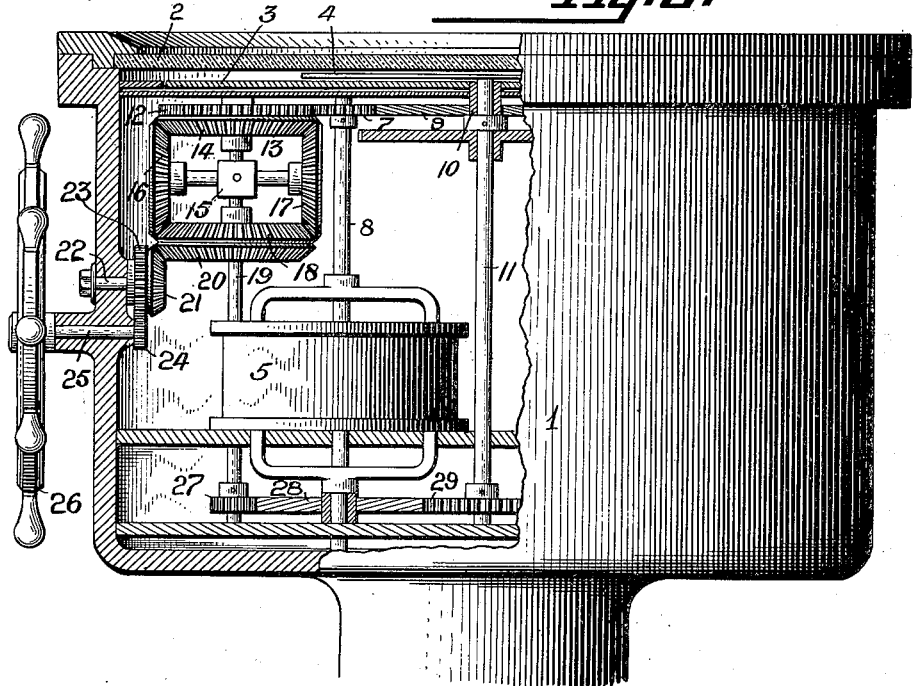
Fig. 5 is a section partly in elevation of the combined repeater compass and control instrument shown in Fig. 1.

In Figs. 1 and 5 the invention is shown as applied to an automatic steering device for ships but the indicating mechanism disclosed therein is adapted for ordinary steering as well as for automatic steering as will be apparent from the following description. The combined controlling and indicating instrument is shown as mounted within the casing 1 having a transparent cover 2 through which is visible repeater compass card or rose 3 and auxiliary indicator-pointer 4, the purpose of which will hereinafter appear. Both indicators are readable on reference mark or "lubber's line" 45. Within said casing is mounted the repeater motor 5 adapted to be actuated directly or indirectly from a master gyro-compass 6 (Fig. 2). Said repeater motor is shown as provided with a pinion 7 on the shaft 8 of the same, said pinion meshing with a larger gear 9 secured to the sleeve 10. Said sleeve is loosely mounted on the central shaft 11 and has secured thereto at its upper end the compass rose 3. The compass rose, therefore, is turned directly from the repeater motor 5.

Said gear 7 also meshes with a second large gear 12 secured to one arm of the differential gear train 13 which is shown as a bevel gear 14 secured to gear 12. The planetary arm has a pair of bevel gears 16 and 17 with which opposite bevel gear 18 meshes. Both gears 14 and 18 are loosely mounted on the shaft 19, while the planetary arm 15 is pinned or otherwise secured thereto. Means are provided for rotating the gear 18 at will. As shown, such means comprise the bevel gear 20 secured to the back of gear 18 and also loosely mounted on the shaft 19. Said gear 20 meshes with a bevel pinion 21 mounted on the shaft 22 and secured to spur gear 23 which meshes with a pinion 24 on shaft 25. A small hand wheel 26 is secured to the shaft 25 for setting the gear 18 at will. Shaft 19 has secured to the lower end thereof a pinion 27 which meshes with an idler 28 loosely mounted on the shaft 8. Said idler in turn meshes with a gear 29 secured to the central shaft 11. It will be apparent that pointer 4 secured to the opposite end of shaft 11 may be adjusted at will and at the same time remain fixed in azimuth in the adjusted position regardless of the turning of the ship by its connection with the repeater motor 5.

It will be understood that the hand adjusting mechanism is so designed that the resistance thereof is much greater than the resistance for turning the pointer 4 so that the gear 18 will remain stationary unless turned by hand and the pointer 4 will only be moved by the rotation of the repeater motor. It will also be understood that the above described mechanism for controlling pointer 4 is intended to be merely illustrative of one type of differential mechanism and that any other arrangement may be employed, if desired. As shown, in the parent case the position of the pointer 4 controls by means of suitable contacts (not shown) within the casing 1 the reversible steering motor 30 which operates through suitable connections such as worm 31, worm wheel 32, sprocket 33, chain 34, and sprocket wheel 35 the steering wheel 36 of the ship. The indicating portion of this mechanism has, however, a marked usefulness whether the ship employs automatic steering or not in that the pointer 4 is of very great assistance to a navigator in maintaining a course. Thus with the hand 4 set on the desired course, the navigator is enabled to detect instantly, without close observation of the readings on the compass card, a deviation from the prescribed course.

Figure 4:
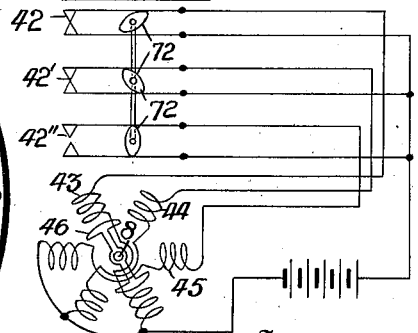
Fig. 4 is a wiring diagram showing the connection of the transmitter on the master compass with the repeater motor.

Fig. 2 illustrates one form of gyro-compass for actuating the repeater motor. As such instruments are now well known in the art no detailed description need be given. Suffice it to say when the ship turns with respect to the gyro element 37 a step-by-step or other transmitter 38 is rotated by means of a gear 39 secured to a portion of the compass, which gear meshes with a small pinion 40 on the shaft 50 of said transmitter. The transmitter may be of any suitable design but is shown in Fig. 2 as of the commutator type having one common brush 41 and three make and break contact brushes 42, 42', and 42''. The operation of this commutator as well as that of the cam type commutator is illustrated in Fig. 4 wherein the make and break contacts are represented at 42, 42', 42'', said contacts being operated by cams 72 to 70 open and close them in the proper sequence. The repeater motor is shown as of the step-by-step type having a plurality of stationary field coils 43, 44, and 45 and a soft iron armature 46 mounted on the shaft 8.

Figure 3:
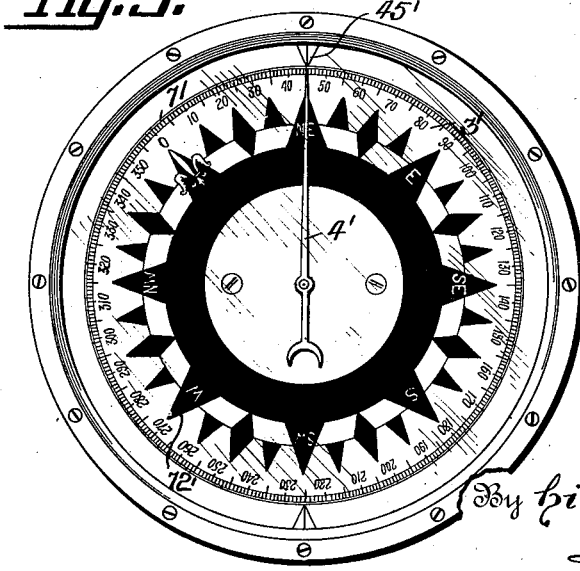
Fig. 3 is a plan view on a larger scale of my invention as applied to a standard repeater compass.
Figure 6:
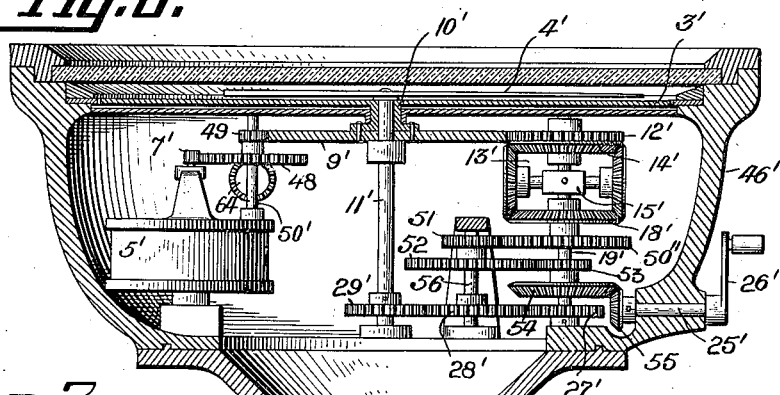
Fig. 6 is a sectional elevation of the improved repeater compass illustrated in Fig. 3.

In Figs. 3 and 6 is shown an improved repeater compass embodying my invention without the feature of the automatic steering. In Fig. 3 an auxiliary indicator 4' and the repeater compass rose 3' will at once be recognized as well as the lubber's line 45'. The rose is shown as provided with both circular graduations 71 in degrees and the standard compass points 72'. Within the bowl 46' of the compass is mounted the repeater motor 5', the shaft of which carries the pinion 7'. Said pinion is shown as meshing with reduction gears 48 and 49 on shaft 50', the latter gear meshing with the large gear 9' secured to the sleeve 10' loosely mounted on the shaft 11'. At the upper end of said sleeve is supported the rose 3'. Gear 9' is shown as meshing with a gear 12' which has secured thereto bevel gear 14' forming one arm of the differential gear train 13'. As before the central arm 15' of said train is pinned to the central shaft 19', while the opposite gear 18' has secured thereto a spur gear 50'' meshing with smaller reduction gears 51 and 52. Gear 52 in turn meshes with pinion 53 secured to the hub of bevel gear 54. A bevel pinion 55 is secured to the shaft 25' and meshes with the bevel gear 54. To said shaft 25' is secured the handle 26' for setting through said pinion and gears arm 18' of the differential gear train 13'. Said central shaft 19' rotates the central shaft 11' by means of pinion 27' secured to the shaft 19', idler 28' loosely mounted on the shaft 56 of gears 51 and 52, and gear 29' pinned to the shaft 11'. Said shaft has secured to the upper portion thereof the auxiliary indicator 4'. The repeater cable (not shown) from the master compass is introduced through the aperture 60 in the bottom of the casing.

Figure 7:
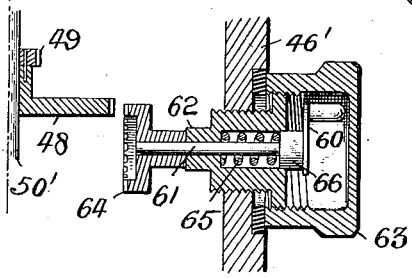
Fig. 7 is a detail of the hand setting means of Fig. 6.

For synchronizing the repeater and master compasses, in case they fall out of step, I have shown a second handle 60 (Fig. 7) mounted on a shaft 61 which is slidably mounted in a thimble 62 in casing 46'. A removable cap 63 may cover the handle, except when it is desired to use it. Shaft 61 carries at its inner end crown gear 64 and is normally pushed outwardly by spring 65 which bears against collar 66 on handle 60. When the handle and shaft are pushed in, crown gear 64 meshes with gear 48 (Figs. 6 and 7) so that by rotation of the handle the card and pointer may be set. On failure of the motor 5' or the master compass, it is obvious that this instrument may be employed as a dummy compass, the two indicators being set by means of handles 26' and 60, indicator 3' being set by hand to correspond to the compass reading.

The uses and advantages of my invention may now be clearly understood. Suppose, for instance, that the navigator desired to steer a course due north-east or 45°. It would then be his duty to maintain the lubber's line 45 (or 45') of the compass exactly opposite the 45° mark on the compass rose. As such division is small and scarcely distinguishable from the other divisions it is exceedingly difficult for the navigator to maintain the two marks in exact coincidence owing to mental fag, eye strain, etc. By setting the pointer 4 or 4', however, by means of the handle 26 or 26' upon the course desired to be steered, i. e. upon the 45° mark, his attention is at once focussed on this particular indication and it becomes very easy to maintain the pointer directly opposite the lubber's line as any deviation of the same due to turning of the ship would at once become apparent. As hereinbefore explained, the pointer 4' is connected to the repeater motor 5' and turned with the compass rose at all times, the only difference being that it is adjustable with respect thereto by means of the handle 26'.

A simplified form of my invention is shown in Fig. 9 in which the differential gearing connecting the compass repeating device and the concentric pointer is eliminated, simply a frictional connection between the pointer and repeater card being employed for causing the pointer to normally follow the repeater card. The compass repeater motor is again shown at 5' and the handle for setting the same at 60. The repeater motor is again geared by reduction gearing 48 to the large gear 9' carrying the repeater card 3'. The pointer 80 is mounted on the spindle 81 but in this instance, as before stated, a frictional connection is employed between the pointer and card or other portion of the compass repeating device for causing the pointer to turn with the card. As shown, the hub 82 of the pointer rests upon the boss 83 of the compass card and is frictionally held thereon by the collar 84 on the shaft 81. In order to set the pointer to any desired position I have shown a thumb piece 85 slidably and rotatably mounted in a thimble 86 secured in a central hole in glass 2'. Said thumb piece is shown as normally pressed upwardly by a spring 86 and carries at its lower end a toothed annular member 87. It will readily be seen that by pressing down the thumb piece toothed member 87 will be brought into contact with corresponding teeth 88 on the hub 82 of the pointer 80 so that by rotating the thumb piece the pointer may be set in any desired position. As soon as the thumb piece is released the pointer is, of course, moved with the card.

A further modification is suggested in Figs. 8 and 10. According to this modification the pointer 80' is again caused to normally move with the card 3' by frictional means such as a spring washer 89 between the pointer and the card. For setting the pointer, however, in this instance a handle 26'' is shown as adapted to be pushed inwardly against the action of the spring 90 to bring the crown gear 91 into mesh with the spur gear 92 on the shaft 11' of the pointer 80'. The repeater motor is again shown at 5' which is geared by gearing (not shown) to a gear 9' mounted on the sleeve 10'' bearing the card 3'. Said sleeve is shown as journalled within the central hub portion 93 rising from the base of the casing 46''.

In this instance, I have shown an additional pointer 95 arranged to rotate at a much greater speed than the pointer 80'. The purpose of the auxiliary pointer is to indicate to the helmsman the departure of the ship from its course more quickly and more strikingly than would be indicated by the relatively slow movement of the pointer 80'. The pointer or other indicator 95 is shown as appearing on the outside of the lubber's ring 145 and the lubber's mark 145', being shown as mounted on the end of an arm 96 extending radially from a sleeve 97 journalled exteriorly of the hollow hub 10''. Said sleeve is shown as provided with a gear 98 adjacent its lower end which meshes with step up gearing 99 and 100 fixed on shaft 101. The pinion 100 meshes with the large gear 92 on shaft 11' of pointer 80'. As pointer 80' turns with the card 3' (except when being set), index 95 will hence be turned through a greater angle than the angle through which the card apparently turns.

The action of the auxiliary indicator 95 is well shown in Fig. 10 wherein the helmsman is endeavoring to maintain a course due west. A slight departure has occurred, however, as shown by the slight movement of the pointer 80' away from the lubber's mark 145'. It will be noted, however, that a much greater movement of the pointer 95 has occurred thereby showing the helmsman at once that he is off the course.

A further advantage may be secured from the hereinbefore described apparatus without alteration in structure. As is well known, the repeater cards normally oscillate through a small angle, say 1°, due to the continuous oscillation present in the master gyroscopic compass. (See my prior Patent #1,300,890 dated April 15, 1919 "navigational instruments".) Such oscillation would, of course, also be communicated to the pointer, especially in the forms of the invention shown in Figs. 8, 9, and 10. In the forms shown in Figs. 1 to 7, however, such oscillation of the pointer may be readily eliminated by constructing the gear trains connecting the gear 9', for instance, (Fig. 6) with the pointer shaft 11' with sufficient backlash or lost motion to prevent the oscillation from being transmitted to the pointer. With such construction although hunting or continuous oscillation of the card would take place the pointer would remain stationary and would only be rotated with the card whenever the ship turned. Other means of preventing oscillation of the pointer will readily occur to those skilled in the art. It will also be apparent that the oscillation of the pointer 95 of Fig. 10 may be eliminated by similar means, if desired, even though oscillation of the pointer 80' is permitted to remain.

In accordance with the provisions of the patent statutes, I have herein described the principle of operation of my invention, together with the apparatus, which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted, and some of the features of each modification may be embodied in the other, and the invention extends to such use.

Having described my invention, what I claim and desire to secure by Letters Patent is:

1. A navigational instrument comprising a rotatable azimuth indicator, a second rotatable indicator, means for setting the latter in any desired direction with respect to the former and the direction determining member of a compass connected to said indicators for maintaining their position in azimuth irrespective of the ship's turning.

2. In a mariner's compass, the combination with the card and reference index, of a second rotatable indicator, means for setting the same to any point on said card, and means for causing said indicator to rotate with said card after being set.

3. In a repeater compass the combination with the repeater card, motor and lubber's mark, of a second rotatable indicator, means for setting the same at any point on the said card, and connections between said motor and indicator for maintaining it at such point.

4. In a repeater compass in which the actuating repeater motor is subject to hunting, the combination with said repeater motor and compass indicator, of an additional indicator, and a connection between said motor and the additional indicator adapted to turn the same whenever the ship turns but to allow the same to remain unaffected by the hunting of the motor.

5. A navigational instrument comprising a rotatable indicator, a differential gear one side of which is connected thereto, a compass repeating device subject to continuous oscillation connected to another side of said gear, and a settable means connected with a third side, means for setting said first-named means, said gear being designed with sufficient lost motion so that the hunting action of the said device is not transmitted to said indicator.

6. A navigational instrument comprising a rotatable indicator, a second rotatable indicator geared to rotate at a multiple speed of the first indicator, a reference index for said indicators, means for setting the indicators, a compass repeating device connected to said indicators, and means for eliminating the hunting action of the said device from at least one of said indicators.

7. In a marine compass, the combination with a card, of a pointer or needle, and means for adjusting and fixing the pointer or needle relatively to any point on the card.

8. In a repeater compass, the combination with the repeater motor, compass card and reference index, of a settable indicator, means for setting said indicator, means whereby said indicator is normally rotatable with said card and adapted to be set on the ship's course, and a second indicator readable on said index and connected with said first indicator to rotate at multiple the speed of said first indicator.

In testimony whereof I have affixed my signature.

ELMER A. SPERRY.